US008514662B2

(12) United States Patent
Paulson (10) Patent No.: US 8,514,662 B2
(45) Date of Patent: Aug. 20, 2013

(54) SONIC RECEIVER AND METHOD FOR RECEIVING DATA THAT USES MODULATION FREQUNCIES THAT REDUCE THE PROBABILITY OF CONFLICT WITH AMBIENT NOISE IN THE ENVIRONMENT (75) Inventor: Brett Paulson, Palo Alto, CA (US)

(73) Assignee: Verifone Systems, Inc., San Jose, CA (US)

(*) Notice: Subject to any disclaimer, the term of this patent is extended or adjusted under 35 U.S.C. 154(b) by 5 days.

(21) Appl. No.: 12/870,767

(22) Filed: Aug. 27, 2010

(65) Prior Publication Data
US 2012/0051187 A1 Mar. 1, 2012

(51) Int. Cl.
H04B 1/06 (2006.01)
H04B 11/00 (2006.01)

(52) U.S. Cl.
CPC . H04B 1/06 (2013.01); H04B 11/00 (2013.01)
USPC .......................................................... 367/135

(58) Field of Classification Search
USPC .......................................................... 367/135
See application file for complete search history.

(56) References Cited

U.S. PATENT DOCUMENTS

| 5,359,367 | A | * | 10/1994 | Stockill ......................... 725/137 |
| 6,038,436 | A | * | 3/2000 | Priest ......................... 455/343.3 |
| 2002/0101917 | A1 | * | 8/2002 | Bibl ............................. 375/224 |
| 2003/0031318 | A1 | * | 2/2003 | Troyansky et al. ........... 380/202 |
| 2004/0031856 | A1 | * | 2/2004 | Atsmon et al. ................. 235/492 |
| 2005/0223030 | A1 | * | 10/2005 | Morris et al. ............. 707/104.1 |
| 2008/0306736 | A1 | * | 12/2008 | Sanyal et al. ................. 704/233 |
| 2009/0041260 | A1 | * | 2/2009 | Jorgensen et al. ........... 381/71.6 |
| 2009/0059903 | A1 | * | 3/2009 | Kubler et al. ................. 370/352 |
| 2009/0076825 | A1 | * | 3/2009 | Bradford et al. .............. 704/271 |
| 2009/0154603 | A1 | * | 6/2009 | Li ................................ 375/324 |
| 2009/0156193 | A1 | * | 6/2009 | Urbanija et al. .............. 455/420 |
| 2009/0169038 | A1 | * | 7/2009 | Knudsen et al. .............. 381/315 |
| 2013/0010979 | A1 | * | 1/2013 | Takara et al. ................... 381/77 |

FOREIGN PATENT DOCUMENTS
EP 2552038 A1 * 1/2013

* cited by examiner

Primary Examiner — Isam Alsomiri
Assistant Examiner — James Hulka
(74) Attorney, Agent, or Firm — Leland Wiesner; Wiesner & Associates (57) ABSTRACT A method, apparatus and computer program product is provided for wirelessly transmitting and receiving data through sonic communication. A method and system is provided for devices to exchange data over the air using a sonic carrier signal. The transmit device has at least one sonic transducer that transmits a sonic carrier signal through the air in accordance with aspects of the present invention. A digital representation of the data is modulated consistent with a modulation protocol using one or more sonic transmission frequencies in accordance with present invention. The sonic transducer transmits the one or more sonic carrier signals carrying the modulated data over the air. Each sonic carrier signal has sufficient gain to carry the signal to a receiver device where the data from the one or more sonic carrier signals is demodulated. Aspects of the present invention receive modulated data through the air using at least one sonic transducer of a receive device. Prior to demodulation, the receive device may be configured to perform the demodulation of the data at one or more sonic transmission frequencies. Sonic carrier signals at these sonic transmission frequencies are demodulated in accordance with a sonic modulation protocol providing a binary representation of the data. Ambient noise captured by the receiver device is processed along with the data transmitted over the sonic carrier signals.

9 Claims, 7 Drawing Sheets

SONIC RECEIVER AND METHOD FOR RECEIVING DATA THAT USES MODULATION FREQUNCIES THAT REDUCE THE PROBABILITY OF CONFLICT WITH AMBIENT NOISE IN THE ENVIRONMENT

BACKGROUND OF THE INVENTION

Aspects of the present invention relate to mobile communication and electronic commerce using a mobile communication device.

Widespread availability and popularity of mobile devices have made them indispensible in both business and everyday use. These mobile devices include portable computing devices such as laptops, netbooks and tablets that provide mobile computing power as well as access to the information on the Internet, text messaging, email and other functions. Other mobile devices such as wireless phone devices not only provide the aforementioned portable computing functions but further include wireless voice capabilities along with applications using features such as built-in cameras, global positioning satellite (GPS) services and others.

The functionality of these mobile devices has converged on a similar set of features in a variety of different form factors. For example, wireless phone devices classified as smartphones tend to have powerful processors and multitasking operating systems previously available only on portable or desktop computing devices. These smartphone devices generally fit in a pocket or purse and have a virtual touchscreen keyboard or miniature "thumb" keyboard for easy entry of data. In comparison, portable computers not only offer general purpose computing power but also operate more like a phone device delivering phone calls and voice capabilities with protocols/services such as voice-over-IP (VOIP) and Skype (Skype is a registered trademark in the United States and other countries of Skype Technologies S.A.).

Despite these advances, mobile devices still have difficulty communicating directly with each other or, for that matter, desktop computers or workstations. When people wish to exchange information, they still generally send an email or text message with their mobile device to the mobile device of the person they are trying to reach. Likewise, mobile devices attempting communication with a desktop computer have little choice but to send the user of the desktop computer a brief email or text message as well. Unfortunately, manually entering information needed for emails or text messages is time consuming, prone to error and often dissuades people from interacting altogether.

Indeed, attempts to establish direct communication between mobile devices has been met with failure for a variety of reason. In many cases, too few devices have the specialized hardware required for communication. For example, infrared transceivers are not found on all mobile devices or computers and therefore lack the scale required to permit reliable communication. Moreover, infrared communication is not only slow but requires a line-of-sight between the transceivers of the devices to operate.

Bluetooth communication is another interesting wireless protocol shared by many mobile devices but it takes too long to sync or "pair" before any communication can take place. The time delay for pairing not only frustrates users but also makes the data transmitted more susceptible to interception. Accordingly, Bluetooth communication may be seen as a security risk and not suited for transmitting sensitive information.

Yet another approach for mobile communication involves displaying and reading bar codes from the display of a mobile device. The bar codes can generally be displayed on a mobile device and then read by another device or computer having a camera or bar code scanner. However, processing bar codes in this manner can be difficult as each display device may need to be configured with different display parameters, aspect ratios, display resolutions and other factors to ensure the bar codes can be read reliably.

Another approach places RFID tags on a mobile device to facilitate quick identification of the phone and promote mobile communication. Indeed, RFID works quickly to identify the mobile device but requires each vendor to purchase a potentially expensive specialized reader device. Given the added expense of the reader and the complexity of accepting payments in this manner, RFID tags and readers have not been widely adopted.

SUMMARY

Aspects of the present invention provide a method and system for devices to exchange data over the air using a sonic carrier signal. The data to be exchanged may be received on a transmit device and converted, as needed, to a digital representation suitable for digital signal processing. For example, binary data on the transmit device may be processed immediately while text or other symbolic data may need to be converted into a digital representation for further processing. The transmit device has at least one sonic transducer that transmits a sonic carrier signal through the air in accordance with aspects of the present invention. The digital representation of the data is modulated consistent with a modulation protocol using one or more sonic transmission frequencies in accordance with present invention. The sonic transducer transmits the one or more sonic carrier signals carrying the modulated data over the air. Each sonic carrier signal has sufficient gain to carry the signal to a receiver device where the data from the one or more sonic carrier signals is demodulated.

Yet another aspect of the present invention concerns a method and system of wirelessly receiving data modulated over one or more sonic carrier signals. Aspects of the present invention receive modulated data through the air using at least one sonic transducer of the receive device. The sonic transducer may also receive ambient noise within the geographic location of the receive device in addition to the one or more sonic carrier signals. Prior to demodulation, aspects of the present invention may configure the receive device to perform the demodulation of the data at one or more sonic transmission frequencies. Sonic carrier signals at these sonic transmission frequencies are demodulated in accordance with a sonic modulation protocol providing a binary representation of the data. Ambient noise captured by the receiver device is processed along with the data transmitted over the sonic carrier signals. In certain cases, the ambient noise may be used to enhance the transmitted data with increased functions such as authentication and security, or it may be eliminated using various filters.

BRIEF DESCRIPTION OF THE DRAWINGS

Like reference numbers and designations in the various drawings indicate like elements.

DETAILED DESCRIPTION

Aspects of the present invention provide one or more of the following advantages. Use of sonic communication of the present invention scales quickly as it is compatible across a wide range of computers and mobile devices. Sound components and other supporting hardware necessary to perform sonic communication in accordance with the present invention are generally available and already installed on most of these devices. For example, many computers and mobile devices may already include CODECS, filters, digital signal processors (DSP), memory and other components necessary for processing sound. These sound components may be built directly into the computer or mobile device or may be added afterwards using an after market sound card or an externally connected peripheral sound device.

Method and systems designed in accordance with the present invention take advantage of these sound components to modulate data on a sonic carrier signal. The sonic carrier signal can be processed by mobile devices and computers from different manufacturers provided the sound components on each device operate at a sufficient sample rate and frequency response. This makes it possible for various devices to communicate together over a wide range of carrier frequencies while running on dissimilar hardware platforms and otherwise incompatible operating systems. For example, a wireless device running the Android operating system can readily communicate sonically with a computer device running Microsoft Windows, the Apple OS X operating system or an Apple iPhone or iPad (Windows is a registered trademark of Microsoft Corporation of Redmond, Wash., Android is a registered trademark of Google, Inc. of Mountain View Calif., iPhone and iPad are registered trademarks of Apple, Inc. of Cupertino, Calif.).

Sonic communication implemented in accordance with the present invention has considerable economic advantages. As previously described, a majority of the hardware required for sonic communication is already installed on the computers and mobile devices of interest. Software designed in accordance with the present invention can be installed on most devices without requiring additional hardware or even a hardware upgrade. In some cases, there may be a nominal cost associated with attaching a microphone or speaker to the sound components already installed on the device. Even if the sound components are not already installed on these devices, there are many after market manufacturers of sound components and sound cards that can be combined with or added to existing hardware at a relatively low-cost. In some cases, it may even be cost-effective to create custom or semi-custom sound card designs using codecs and processors available from companies such as Texas Instruments.

Figure 1:
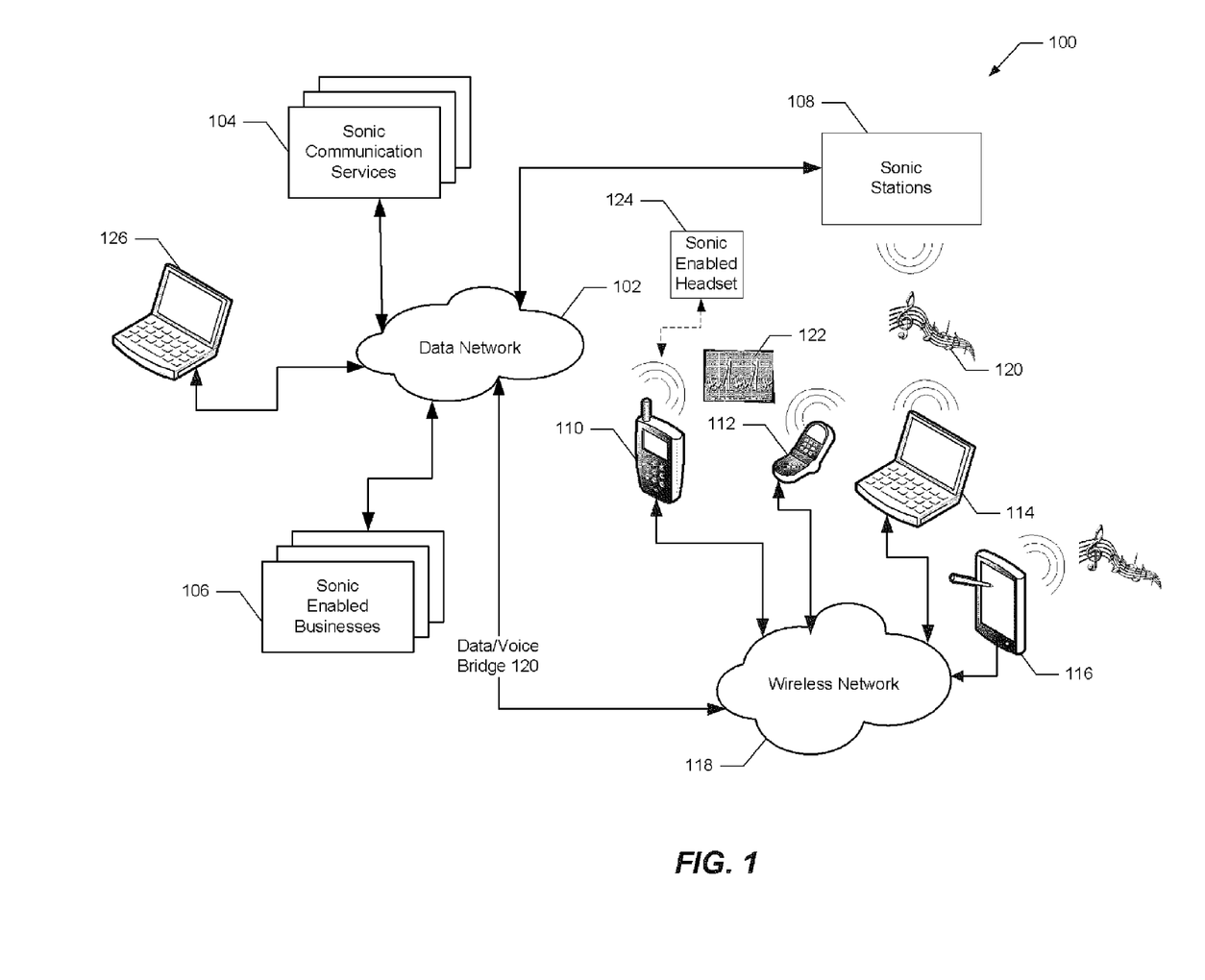
FIG. 1 is a block diagram illustrating a communication network in accordance with aspects of the present invention.

FIG. 1 is a block diagram illustrating a communication network 100 in accordance with aspects of the present invention. In one implementation, sonic communication services 104, sonic stations 108 and sonic enabled businesses 106 are operatively coupled together over a data network 102. Data network 102 can be the Internet or any other network.

Sonic enabled businesses 106 include any business implementing the sonic communication methods and systems designed in accordance with the present invention. These sonic enabled businesses may implement sonic communication services 104 to enable communication between computers and mobile devices in the course of selling their products or services. For example, sonic enabled businesses 106 may include social networking sites that implement aspects of the present invention and allow mobile devices to directly transmit their contact details to each other. Sonic enabled businesses 106 might also include retail businesses using sonic communication methods and systems of the present invention to accept payments, process gift cards, coupons, loyalty awards and other programs.

Sonic stations 108 represent one or more fixed points for distributing or receiving sonic communication in accordance with the present invention. Illustrative examples of sonic stations 108 may include point-of-sale (POS) registers for the sale of goods or services, kiosks distributing information at malls, museums or other public areas as well as any terminal used to facilitate any transaction of value with a mobile device or computer. The term value is meant to broadly include points in loyalty programs, prepaid telecommunications minutes, prepaid gift cards, airline mileage, digital music downloads, streaming music, streaming video, streaming multimedia as well as any other service or product of some worth to one or more parties.

Sonic communication services 104 facilitate processing certain portions of the sonic communications for sonic enable businesses 106 and any of the various devices coupled to wireless network 118. Implementations of sonic communication services 104 may include a combination of computers, servers, communications equipment and software designed, configured and created in accordance with the present invention. For instance, there may be software applications installed on servers encoding/decoding data modulated over sonic carrier signals in accordance with the present invention. It is also contemplated that communication equipment may be specially configured and/or embedded with firmware to support using sonic communication of the present invention and prioritize high value transactions such as involving electronic commerce. For example, the firmware may enable high-availability (HA) protocols for ensuring an orderly completion or roll-back of transactions when an unexpected communication failure occurs anywhere along the communication path downstream from the sonic communication services 104, between the devices coupled to the wireless network 118 or within systems supporting sonic communication services 104. Additional measures may also be taken to prioritize electronic commerce transactions above non-commercial transactions within sonic communication services 104 to ensure a more rapid processing of the data and resultant transactions among sonic stations 108 and devices coupled to wireless network 118.

In one aspect, sonic communication services 104 may include a set of preliminary or front-end services for managing the initial creation of data to be sent between devices. These front-end services may include authoring media such as audio files embedded with data modulated over one or more sonic carrier signals. Sonic communication services 104 can be used to author media with modulated data when it is not desirable to perform the modulation directly on a device or devices using sonic communication. For example, it might be advantageous to use sonic communication services 104 to install an audio file with modulated data on a device during manufacture. The data may be used to identify the device when the audio file is played back and demodulated by another device in accordance with the present invention. Depending on the device, sonic communication services 104 may store the audio file in non-volatile random access memory (NVRAM) during manufacture such as flash memory, read-only memory (ROM), programmable ROM (PROM), or erasable PROM.

Further aspects of sonic communication services 104 may include back-end services that help facilitate more complex transactions between two or more devices using sonic communication of the present invention. Devices registered with sonic communication services 104 receive identifiers sonically transmitted to each other during a transaction. Sonically enabled devices receive the identifiers then forward to sonic communication services 104 over data network 102 where the identifiers are further processed and associated with their respective registered devices. For example, these sonically enabled devices may include any combination of sonic stations 108 and the various devices coupled to wireless network 118 illustrated in FIG. 1. Once devices are positively identified, various types of transactions can be performed securely and robustly in a variety of circumstances.

Some sonic enabled businesses 106 may choose to utilize sonic communication services 104 over data network 102 based upon a software as a service (SaaS) model. The SaaS model can be used to deliver sonic communication services 104 in accordance with aspects of the present invention on a subscription basis. Typically, pricing depends on the time period and volume of use with respect to sonic communication services 104. Delivering sonic communication services 104 over a network in this manner can also be referred to as a "cloud computing" solution as the local devices take advantage of software services and processing power located remotely on computers across a network.

Instead of the SaaS or cloud computing model, alternate implementations may instead install sonic communication services 104 on a dedicated computer or appliance located on the business premises. The locally installed appliance solution gives businesses more direct access and control over the computers and software running sonic communication services 104. Advantageously, the appliance solution enables businesses to better control the reliability and availability of sonic communication services 104 with redundant systems, virtualization and increased monitoring. Moreover, the locally installed appliance with sonic communication services 104 might save money for a business provided the annual license fee and appliance costs are less than equivalent subscription fees.

Yet another implementation delivers sonic communication services 104 partially using a cloud computing model and partially as an appliance. Frequently used functions requiring higher performance from sonic communication services 104 may be preloaded on the locally installed appliance. Less frequently used functions not available locally are accessed from sonic communication services 104 in the cloud. The sonic communication services 104 delivered partially as an appliance and partially in the cloud has the optimal combination of benefits from both modalities of delivery.

A wireless provider may provide a data/voice bridge 120 connecting various devices over wireless network 118 to data network 102. In general, wireless network 118 provides voice communication capability between some or all of the devices registered on the wireless network 118. Data services like Internet or intranet access and SMS text messaging may pass through a data channel portion of the data/voice bridge 120. Data/voice bridge 120 can also serve to connect wireless network 118 to other data and wireless networks (not shown).

In this example, devices on wireless network 118 may include wireless smartphones 110, conventional mobile phones 112 (also referred to as mobile feature phones), laptops 114 and smartbooks 116. In addition to transmitting voice, some of the more sophisticated mobile devices such as smart phones 110 have powerful processors, larger data storage capacity and the ability to display high resolution images and text in various fonts and point sizes on larger screens. Mobile devices provisioned on wireless network 118 generally have a phone number and the ability to place a voice call to other mobile devices. Wireless phone providers for wireless network 118 may implement any one or more different wireless protocols including Global System for Mobile (GSM), Code Division Multiple Access (CDMA) and variants compatible with one or more features of these technologies.

Mobile devices on wireless network 118 such as smartphones 110 may use a data protocol such as TCP/IP to access data network 102 through data/voice bridge 120. These mobile devices have built-in modems to access wireless network 118 and sufficient computing power to process the associated data protocol for accessing data network 102. Certain other devices such as laptops 114 and smartbooks 116 have also been equipped with modems to both wireless network 118 and data network 102.

Alternatively, aspects of the present invention also works with mobile devices such as laptop 126 connected directly to data network 102. Laptop 126 bypasses wireless network 118 and accesses data network 102 directly using either a wired connection such as Ethernet over a physical medium such as CAT5/6 or a wireless medium such as Wi-Fi, Wi-MAX or others. It is also contemplated that any or all of the devices on wireless network 118 may also communicate directly with data network 102 if they are further equipped with Wi-Fi, Wi-MAX or other wireless data communication and protocols.

Sound components and capabilities are essential to making sonic communication of the present invention operate. Fortunately, laptops 114/126, smartphones 110, conventional mobile phones 112, and smartbooks 116 generally have sound components that digitally process sound at high-sample rates and a wide frequency response. Indeed, even a wireless headset 124 can use aspects of sonic communication in accordance with the present invention provided the codec in the headset has a sufficiently high sample rate and reproduces sound over a wide enough frequency response.

In general, sonic stations 108 have built-in sound components that enable these devices to perform sonic communication in accordance with the present invention. For example, many retail point-of-sale registers and kiosk systems are based upon computer platforms with sound components that digitally process sound with high sampling rates and wide frequency response. To sonically communicate with sonic stations 108, it may be necessary to install sonic transducers on sonic stations 108 to either transmit or receive signals over a speaker or microphone respectively.

It should be appreciated that aspects of the present invention allow a wide range of communication to take place between the devices depicted in FIG. 1. In one example, sonic stations 108 can send data encoded in accordance with the present invention and mixed in with an audio stream that plays a recognizable "jingle" or music 120. People recognizing the music 120 playing in the audible range may then expect a decode application running on their mobile device and designed in accordance with the present invention to capture the music and decode the data sent by sonic stations 108. Depending on the design, it is possible for a single POS register to transmit the audio stream embedded in music 120 to more than one of laptops 114/126, smart phones 110, conventional mobile phones 112, and smartbooks 116 (i.e., a one-to-many communication). Likewise, alternate designs may limit similar communications between a single POS register and a single mobile device (i.e., one-to-one communication).

Smartphones 110 and other devices coupled to wireless network 118 may also transmit and receive data encoded within an audio stream to each other in accordance with the present invention. These sonic communications may occur "silently" by omitting the audible musical cue or "jingle" and selecting a frequency and gain for the sonic carrier signal 122 inaudible to most people. Nonetheless, while the signal may not be detected by a person, microphones on the devices actively listening for sound will readily capture the sonic carrier signal 122 and decode the data for further processing.

Figure 2:
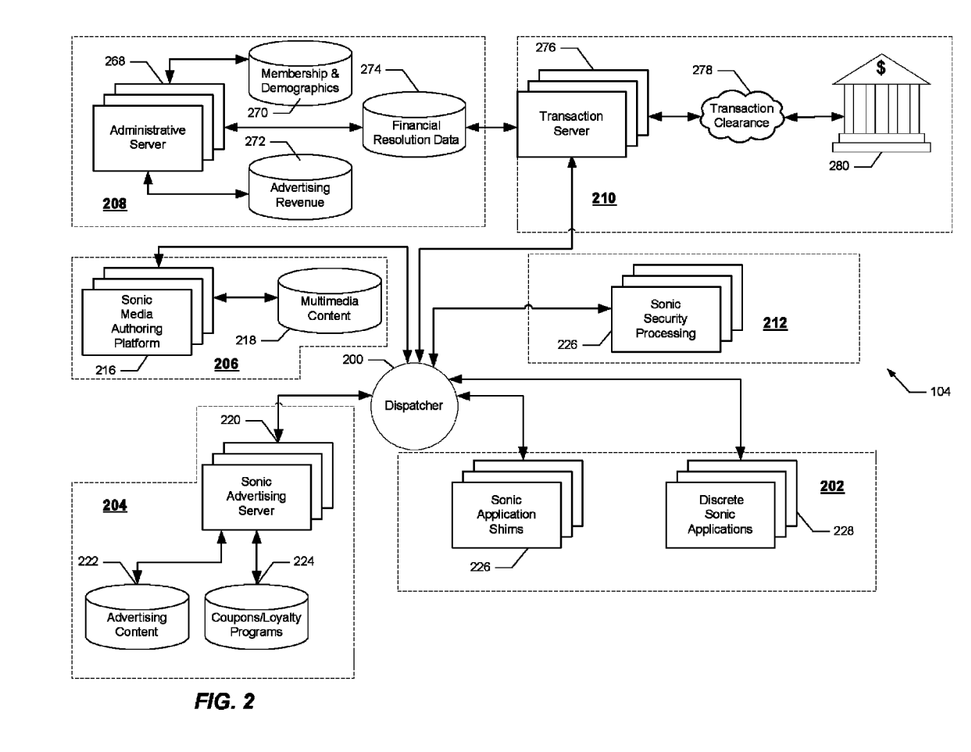
FIG. 2 is a schematic block diagram of the systems and methods for implementing aspects of sonic communication services in accordance with the present invention.

FIG. 2 is a schematic block diagram of the systems and methods for implementing aspects of sonic communication services 104 in accordance with the present invention. Since FIG. 2 is an illustrative schematic design, the actual organization of the functions could be combined or separated in a different manner other than how presented in this example. It is also contemplated that greater or fewer functions than those illustrated and described in conjunction with FIG. 2 could be included in accordance with systems and methods of the present invention.

Accordingly, sonic communication services 104 includes a dispatcher 200 that distributes processing of tasks to one or more areas of operations including a sonic application store 202, sonic marketing systems 204, sonic authoring systems 206, accounting systems 208, financial transaction systems 210 and sonic security systems 212. Each of these systems may be implemented with a combination of computers, communication equipment and software to distribute tasks and results.

Application store 202 includes applications implementing sonic communication designed in accordance with aspects of the present invention. Applications can be downloaded onto smartphones, feature phones, computers or other devices that communicate and transact with other sonically enabled devices. It is contemplated that sonic communication of the present invention will greatly enhance existing websites and applications as well as spawn the creation of entirely new functions and applications.

In general, the software in application store 202 can be divided into sonic application shims 226 and discrete sonic applications 228. Sonic application shims 226 provide developers with libraries and application programming interfaces (API) to add sonic communication features to their existing applications. Some sonic application shims 226 may provide general purpose APIs while other sonic application shims 226 may be tailored to the requirements of a certain class of applications. In comparison to a shim, discrete sonic applications 228 may be entirely new applications developed around the sonic communication features of the present invention.

Specifically, one sonic application shim 226 may include APIs for integrating sonic communications of the present invention with a particular social network platform such as Facebook, MySpace, Ning, Twitter, or Four-Square. Such sonic application shim 226 may allow in-person exchange of social network ids and data rather than over the Internet. Accordingly, mobile versions of these social websites enhanced with the present invention can allow subscribers to exchange personal information and contact information from their various social networks directly using their mobile devices.

In addition, APIs for social networking would further enable microlocation vis a vis strategically placed sonic stations 108. For example, a sonic station 108 placed in a supermarket would enable a mobile device user to accurately identify their location and then broadcast their location to other members of the social network. Microlocation facilitated by sonic communication of the present invention could be designed to work at various distances between the sonic station and a mobile device thus providing more accuracy than alternate solutions such as GPS (global positioning satellite) systems.

A further subset of the applications contemplated using sonic communications of the present invention include coupon-clipping, point-of-sale (POS) systems and paperless receipts, sonic payment systems, ringtone exchange, sonic voting, sonic data transfer and cloud-based storage, sonic dating matchup, sonic vending, video sharing, audio sharing, in-store discount systems, loyalty programs, gift-card management and redemption, and kiosk systems for information delivery.

In one implementation, coupon-clipping is an application on a mobile device that collects coupons sent sonically from a personal computer in accordance with aspects of the present invention. For example, a mobile device positioned near the speakers of a computer receives sonic codes encoded in the various articles, banner ads, display ads and click-thru advertisements found on websites on the Internet. As people visit these websites, the advertisements play audio modulated with the sonic codes. The audio is demodulated on the mobile device where the sonic codes may be exchanged for coupons or promotional items.

Alternatively, coupons may be delivered to the mobile devices in-store through sonic stations 108 strategically placed within a store. These sonic codes are also decoded on the mobile device and exchanged for electronic coupons and discounts downloaded into a coupon clipping application running on the mobile device. To redeem coupons, the mobile device may send corresponding sonic signals associated with the coupons to a POS system. The POS securely processes the coupons and payment information and returns a paperless receipt to the mobile device once the product or service purchase is completed.

Sonic payment systems can also use sonic communication to transmit payment or value using debit, credit, cash, or other forms of monetary exchange such as with PayPal® (PayPal is a registered trademark of Ebay, Inc. of Sunnyvale, Calif.) These payments may take place between a mobile device and point-of-sale (POS) register, between mobile devices or between various combinations of other types of sonically enabled devices.

Ringtone exchange uses sonic communication to send ringtone codes representing downloadable ringtones to sonically enabled devices. For example, a mobile device may receive a sonic code over a speaker for downloading a ringtone onto the mobile device. The mobile device would then decode the sonic code and use it to access and download the ringtone over the Internet.

Sonic voting transmits sonic codes through a speaker and onto a mobile device whereupon the voting is initiated. These sonic codes for voting are decoded on the mobile device where the voters place their votes and send over the Internet. Sonic voting could be used in numerous contexts from local/ state/federal elections to television shows having audience participation and voting. In the case of television broadcasts, the sonic codes can be transmitted during the broadcast over the television speakers to the mobile devices and users who then place their votes or voice their opinion as requested.

Sonic data transfer and cloud-based storage allows the storage and exchange of general data between two or more sonically enabled devices. For example, people can use sonic data transfer to move data from a work computer to a mobile device, cloud-storage or to some other location using sonic communication of the present invention.

Sonic dating matchup of the present invention allows people to opt-in or opt-out of sending personal information via a sonic carrier signal to other individuals in the geographic vicinity of a nightclub, supermarket or elsewhere. If they do opt-in, these individuals could then also selectively share more personal contact information such as a home address/phone number, on-line contact information, or email addresses.

Sonic vending applications would allow sonically enabled vending machines to receive sonic communication from a mobile device and dispense certain products or services. For example, a mobile device might send a sonic signal to a vending machine that gives the vending machine the ability to access a limited amount of money from a checking account or credit card and pay for the product or service. It is contemplated that the vending machine would use the Internet, a dial-up telephone line or other networks to securely access bank accounts, credit cards and other sources of money.

In one implementation, sonic marketing systems 204 manage marketing campaigns and placement of advertisements using sonic communication associated with aspects of the present invention. The sonic marketing systems 204 in this example include a sonic advertising server 220, advertising content 222 and coupons/loyalty programs 224. Advertising content 222 includes videos with audio, images with audio and also stand-alone audio authored with sonic codes. In one example, advertising content 222 and audio would be delivered when certain websites were accessed, when certain selectable elements on the websites are accessed by a user or from certain search results. Upon these or other similar events, sonic advertising server 220 would ensure delivery of the audio portion of the multimedia advertising content 222 authored with sonic codes embedded therein. Playing the audio back through the speakers of a computer or other system causes advertisements, coupons or other marketing materials to appear on the mobile device demodulating data from the sonic signal.

Coupons/loyalty programs 224 would be delivered in a similar manner to advertising content 222 except that a user would register in advance with a website in and opt-in to receiving coupons or loyalty bonus points. For example, a user might register with a retail website such as Starbucks® to receive coupons and be a member of their loyalty program (Starbucks is a registered trademark of Starbucks Corporation of Seattle, Wash.). Upon visiting certain websites, sonic advertising server 220 would deliver a retail ad for display that also sends an audio code to the user's mobile phone and gives them loyalty points and/or a coupon that they can redeem at a retail store such as Starbucks®. For example, loyalty points at a Starbucks could be redeemed for a free drink or possibly other benefits for obtaining a certain amount of points. Coupons from multiple vendors can be collected using single coupon clipping application stored on the mobile phone and redeemed on a POS register sonic communication of the present invention.

Authoring system 206 provides tools and applications that modulate sonic codes within a digital stream in accordance with aspects of the present invention. These tools and applications convert data into digital codes and modulate them over a sonic carrier signal within various types of multimedia content 218. In some implementations, authoring system 206 executes on a mobile device allowing the mobile device to directly modulate data over the sonic carrier signal in accordance with the present invention. Other implementations allow the mobile device to send data over a network like the Internet to a server where a server such as sonic media authoring platform 216 performs the authoring on behalf of the mobile device.

Accounting system 208 performs functions related to enrollment and generation of revenue for a sonic communication system in accordance with aspects of the present invention. In one implementation, accounting system 208 includes an administrative server 268, membership and demographics 270, advertising revenue 272 and financial resolution data 274. Administrative server 268 coordinates tasks between the various subsystems and updates one or more respective databases.

Membership and demographics 270 manages registration of members and also produces demographic information useful for selling marketing and advertising products and services. Microlocation information can also be collected if a sonic enabled mobile device is used to "check in" to a location with a fixed sonic device such as a sonically enabled POS register. In this context, membership and demographics 270 may not only provide detailed and updated purchase information on transactions but the location of a sonically enabled device and possibly how long the sonically enabled device is within a particular store or location before making a purchase. Financial resolution data 274 contains information for collecting revenue and payment to business partners using the sonic communication system.

Financial system 210 involves collection of revenue from advertising placement and other sonic communication services in accordance with aspects of the present invention. The financial system 210 includes a transaction server 276 for keeping track of financial events and transaction clearance process 278 to debit and credit funds from financial institutions 280. In one implementation, transaction clearance process 278 has the authority to securely interact with financial institutions 280 using automated clearing house (ACH) transfers, wire transfers, and credit cards to ensure a proper transfer of funds.

Sonic security processing 212 includes computers, communication devices and software for providing various types of security along with securely implementing aspects of sonic communication of the present invention. In one implementation, sonic security processing 212 uses sonic codes to implement public-private key management. For example, mobile devices can exchange public keys by modulating a public key as data exchanged through one or more sonic communication signals. Authentication of transactions may be implemented though a comparison of sound samples taken from the locale when and where the transaction occurs. Any or all parties to a transaction may be required to provide comparable sound samples if the transaction is to be honored. Conversely, if parties to the transaction have sound samples that differ beyond a threshold, the transaction between the two or multiple parties may be considered void.

Figure 3:
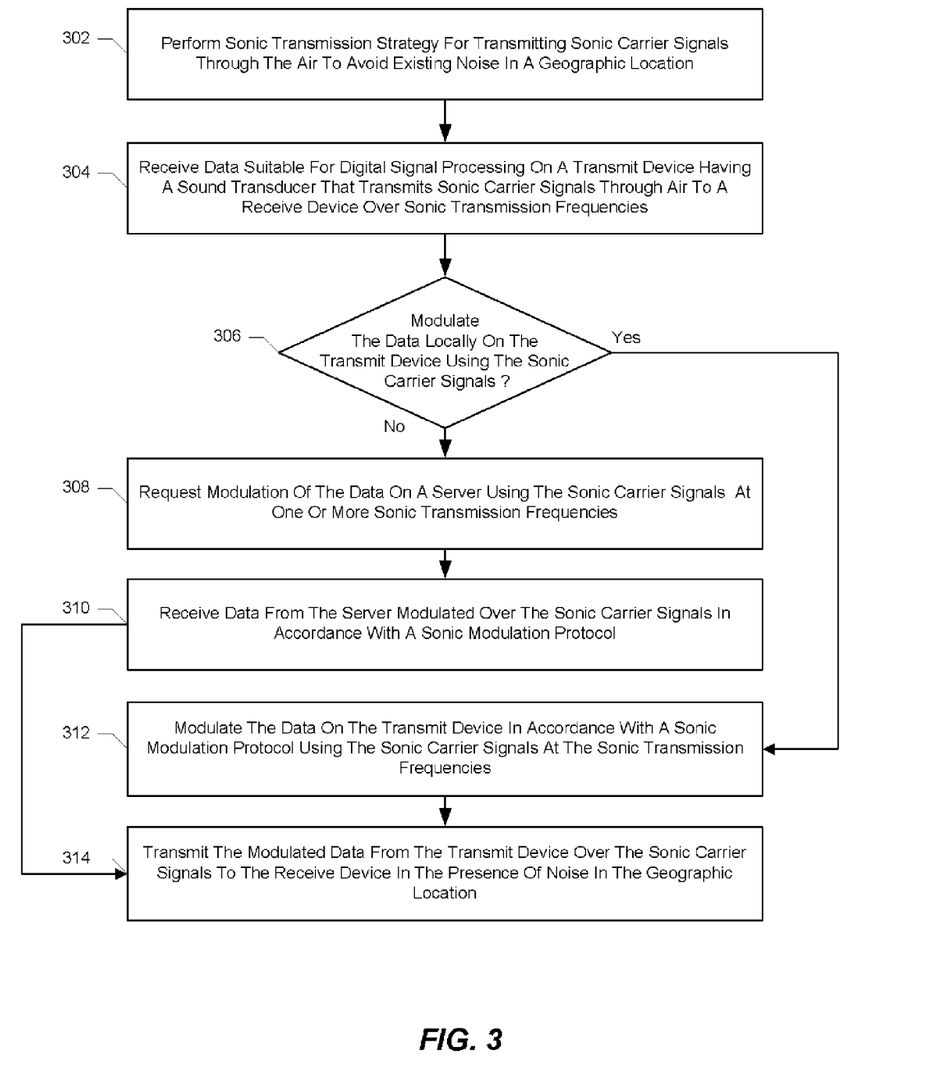
FIG. 3 is a flowchart representation of the operations for wirelessly transmitting data modulated over a sonic carrier signals in accordance with implementations of the present invention.

FIG. 3 is a flowchart representation of the operations for wirelessly transmitting data modulated over a sonic communication signal in accordance with one implementation. Aspects of the present invention provide sonic transmission strategies for transmitting a sonic carrier signal while avoiding existing noise in a geographic location (302). Since sound transmission is unregulated, the full spectrum of sonic frequencies is generally available for use by the sonic communication system. For example, in a quiet environment a sonic communication system and method of the present invention aspects may be able to transmit over a sonic frequency range starting as low as 20 Hz and as high as 60 KHz. With a low level of noise, aspects of the present invention may achieve robust sonic communication using most if not all of the frequencies from within this sample range of sonic transmission frequencies.

In noisier environments, aspects of the present invention continue to achieve robust communication through careful selection of the sonic transmission frequencies and timing of the transmission. Samples of the ambient sound in the area are used to create a noise characteristic indicative of the most prevalent sounds. If the noise characteristic indicates that the desired sonic transmission frequencies are unavailable, aspects of the present invention may decide to delay transmission of the sonic signal a random interval of time, resample and then retransmit. A variant of this strategy may also determine that aspects of the present invention not only delay transmission but transmit sonic carrier signals multiple times in an effort to overcome a temporary use of the desired sonic frequencies in the area. For example, the noise of a coffee grinder in a coffee shop may fill a wide range of available sonic frequency spectrum for a very short period of time. Aspects of the present invention may delay one or more intervals of time until a subsequent sample of the sound indicates that the grinder has stopped and the sonic transmission frequencies are available. Details associated with the strategy process are described in further later herein with respect to FIG. 4.

Next, a transmit device receives data to be transmitted through air using the sonic carrier signals over the sonic transmission frequencies (304). The data may be binary information suitable for immediate signal processing or may be symbols such as alphanumeric data submitted through applications associated with short messaging service (SMS) communications, emails, or communications within social network services such as twitter, Facebook, MySpace, FourSquare and others. Generally, the transmit device receives data from these applications or others through a set of application programming interfaces (APIs) incorporated into the sonic transmission method and system. Alternatively, it is also possible for a user to enter data directly into the sonic transmission method and system of the present invention through keystrokes captured by a data entry interface.

Data received on the transmit device may further include sonic codes that indirectly access data in databases and other lookup-type services. For example, data transmitted from the transmit device to the receive device might be a sonic code corresponding to a credit card or bank account entry in a database located on one or more servers in accordance with aspects of the present invention. If alphanumeric or other symbols are used for these sonic codes, the symbols may first be converted into a digital stream of data for further processing.

To send and receive the sonic communication signal, both the transmit device and the receive device should each have at least one and possibly two or more sonic transducers. For example, the sonic transducer on the transmit device for sending the sonic communication signal can be a speaker and the sonic transducer on the receive device can be a microphone. It is also possible that a single sonic transducer could be used for sending and receiving the sonic communication signal depending on the implementation and overall system requirements.

Next, aspects of the present invention determine if the data should be modulated over the sonic carrier signal locally on the transmit device or remotely using a server (306). To conserve processing on the transmit device, aspects of the present invention may send the data to the server for processing and modulation (306—No). Modulation on the server may be necessary if the transmit device has limited storage or processing power such as with a basic mobile phone or feature phone. In one implementation, the transmit device sends the data over a network for modulation on the server at one or more sonic transmission frequencies (308). Once the server completes the modulation, the transmit device receives data back from the server modulated in accordance with a sonic modulation protocol designed in accordance with the present invention (310).

The server modulates the data on a sonic carrier signal using the specified sonic transmission frequencies in accordance with a sonic modulation protocol. For example, the server may use multiple sonic transmission frequencies to implement a protocol based upon frequency shift key modulation (FSK). In accordance with one implementation, the FSK protocol generally transmits over at least two different frequencies—a "1" may be transmitted on one sonic transmission frequency while a "0" may be transmitted on another sonic transmission frequency. While FSK is one useful modulation protocol, alternate modulation protocols may also be used including minimum shift keying (MSK), quadrature phase shift keying (QPSK) and others.

If the transmit device has sufficient processing and storage capabilities, the data may be modulated on the transmit device (306—Yes). In this implementation, the transmit device modulates the data using the sonic carrier signals at one or more sonic transmission frequencies (312). As described later herein, the sonic transmission frequencies used by the sonic carrier signals may avoid interference with the noise in the locale using one or several different sonic communication strategies.

Next, the transmit device transmits the modulated data over the sonic carrier signals through the sonic transducer and over the air to the receive device (314). The present invention provides robust sonic communication even in the presence of noise. It is contemplated that gain of the sonic carrier signals should be adjusted to carry them the requisite distance to the receive device where data from the sonic carrier signal is demodulated.

Figure 4:
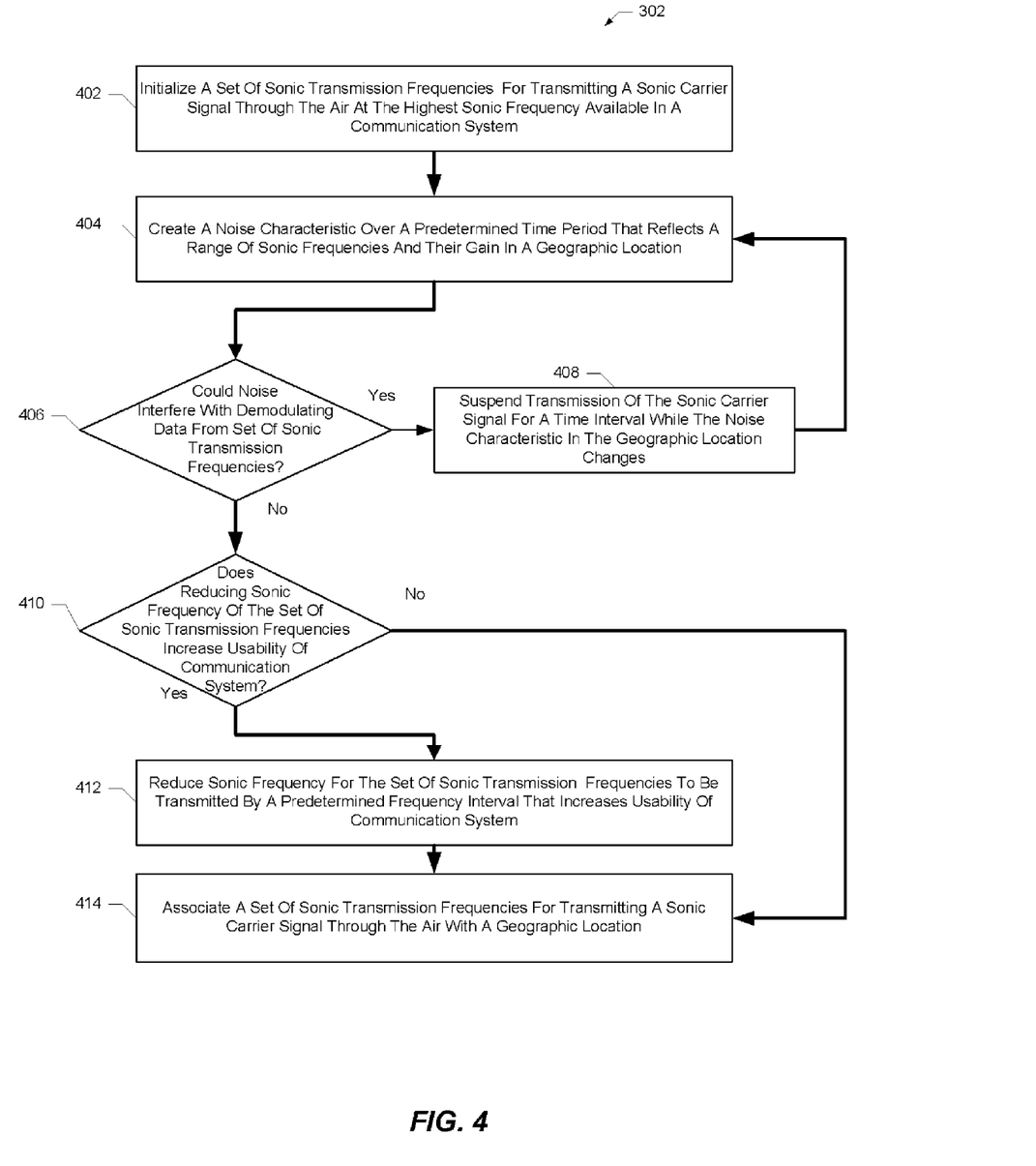
FIG. 4 is a flowchart representation of the operations for implementing sonic transmission strategies that reduce the probability of interference from noise in accordance with aspects of the present invention.

Further details on strategies to reduce the impact of noise on sonic carrier signals are provided by the flowchart in FIG. 4. Accordingly, aspects of the present invention initially set the sonic transmission frequencies to the highest frequencies available in a communication system (402). These frequencies are initially determined by the highest frequencies the transmit device can send and the receive device can detect and decode. This means that the transmit device must be able to modulate the data at these frequencies as well as have the output stage and transducer, such as a speaker, to reproduce these signals. For example, the transmit device should be equipped with a codec or functional equivalent that samples at least twice the sonic frequency being transmitted. Likewise, the receive device needs to be equipped with a similar type codec as well as a transducer, such as a microphone, sensitive enough to detect the sonic carrier signal and demodulate the data. Once again, the receive device sample rate should be at least twice the transmission frequency to accurately reproduce the sonic carrier signal.

Figure 5:
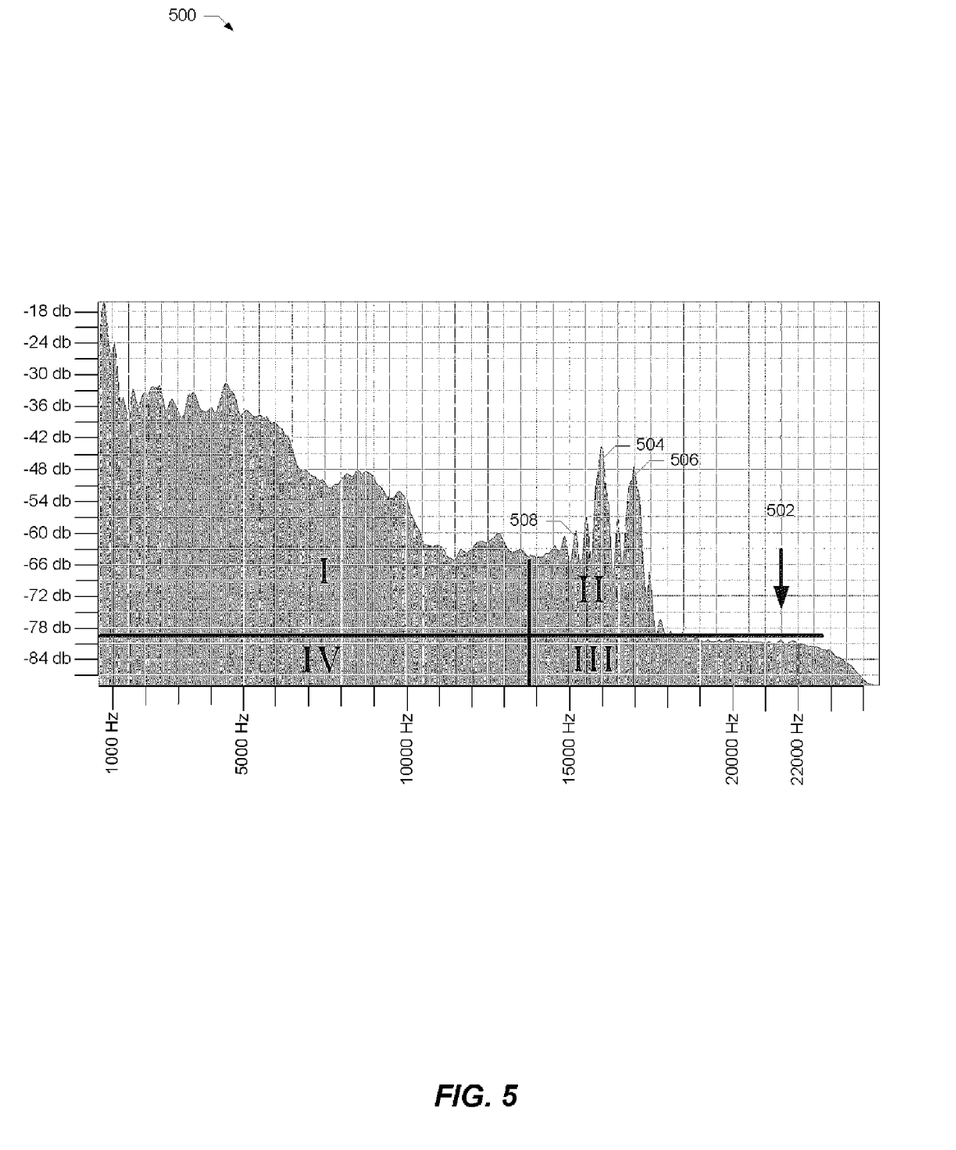
FIG. 5 is a one exemplary graph illustrating a sonic frequency response as received by a receive device in accordance with one implementation of the present invention.

Next, aspects of the present invention creates a noise characteristic over a predetermined time period that reflects a range of sonic frequencies and their gain in a geographic location (404). In one implementation, the noise characteristic is created by recording or "sniffing" a sample of the sound in a geographic location. Samples may be recorded once or multiple times over a period of seconds, minutes hours, days, or longer periods. FIG. 5 illustrates one example noise characteristic displaying gain and frequency along with sonic carrier signals of the present invention.

Using the noise characteristic, the present invention determines whether a receive device could potentially demodulate data from sonic carrier signals and sonic transmission frequencies (406). In one implementation, the noise characteristics are first analyzed to determine what sonic transmission frequencies, if any, are available within the sample or samples of the sonic spectrum. For example, a noise characteristic may reflect an absence of sonic noise in the range of 15 Khz to 22 Khz. Second, aspects of the present invention evaluates the sample rate and sensitivity of the receive device in light of the available sonic transmission frequencies. To demodulate the transmitted signals, the receive device must have a sample rate of at least twice the sonic transmission frequency. It is contemplated that the sample rate and other characteristics of the receive device are either known in advance or discoverable in accordance with aspects of the present invention.

It may be determined that the receive device is incapable of demodulating data transmitted over the set of sonic transmission frequencies (406—Yes). In one instance, the sonic transmission frequencies available according to the noise characteristic may be too high for the receive device to sample and demodulate. Alternatively, it is also possible that noise in the area covers a wide sonic spectrum leaving no sonic transmission frequencies available even at the highest frequencies of the communication system. In either of these or other situations, one implementation of the present invention suspends transmission of the sonic carrier signals for a time interval (408). During this interval, the present invention considers that the noise characteristic in the geographic location will change and make more sonic transmission frequencies available for the receive device to demodulate. In particular, it may be expected that the noise characteristic will change over the time interval making the higher sonic transmission frequencies available for sonic communication. It is contemplated that this time interval can be a predetermined period of time or may be a random or pseudo-random period of time. Once the time interval expires, aspects of the present invention samples the noise characteristic yet another time (404) and processing continues.

Eventually, a set of sonic transmission frequencies are identified that the receive device is capable of demodulating (406—No). In one implementation, the present invention checks if the noise floor at these particular frequencies in the noise characteristic is low enough to not interfere with the transmission of sonic carrier signals at the sonic transmission frequencies. If the signal-to-noise (SNR) ratio at these frequencies is higher than a predetermined threshold, it is probable that the receive device could demodulate data when the sonic carrier signals are transmitted. In most instances, it is desirable to not reduce the sonic transmission frequencies as the higher frequencies may transmit with less interference from noise and other sound in the lower frequency range (410—No). For example, sonic carrier signals at the higher sonic transmission frequency may experience less interference from the audible sound in the lower frequency range.

In other instances, however, a reduction in the sonic transmission frequencies increases the usability of the sonic communication system and method (410—Yes). In particular, lowering the sonic transmission frequencies might be more comfortable for people hearing the signal transmitted between transmit and receive devices. For example, a person might be disturbed hearing a 17.5 kHz signal modulated with data, yet have no discernable reaction hearing a 15 kHz signal with the same modulated data. Decreased sonic transmission frequencies might also increase the usability as it affects the distance and direction a sonic signal may travel (412).

Once identified, aspects of the present invention then associates a set of sonic transmission frequencies for transmitting a sonic carrier signal with a geographic location (414). It is contemplated that the set of sonic transmission frequencies could be one or more frequencies needed to perform sonic communication in accordance with the present invention. For example, two or more sonic transmission frequencies might be used to implement an FSK protocol in accordance with the present invention.

FIG. 5 is a graphical representation of a noise characteristic 500 for a particular location in accordance with one implementation of the present invention. Four regions of this graph have been enumerated to better understand sonic communication of the present invention. Region I depicts the frequency and gain associated with noise sampled in the geographic area and generally includes the audible range of sound people can hear. Region II reflects the sonic transmission frequencies suitable for sending sonic carrier signals in accordance with the present invention. In this example, sonic carrier signals 504 and 506 may be used for modulating data according to a sonic protocol such as FSK. Harmonics 508 are also within Region II and should also be considered when identifying and analyzing the sonic transmission frequencies used by the system. Indeed, while higher sonic transmission frequencies in Region II may be available, the sampling rate of the communication system may limit the highest frequency to a sonic frequency limit 502 as illustrated.

Region III reflects a noise floor associated with ambient noise generally considered above the audible frequency range. Many of frequencies in Region III are available for use by the sonic communication system and method of the present invention. In contrast, Region IV shows a more active region of sound and a noise floor within the audible range of sound. Fewer sonic transmission frequencies may be available for use by aspects of the present invention given the higher gain associated with the audible noise in Region IV.

Figure 6:
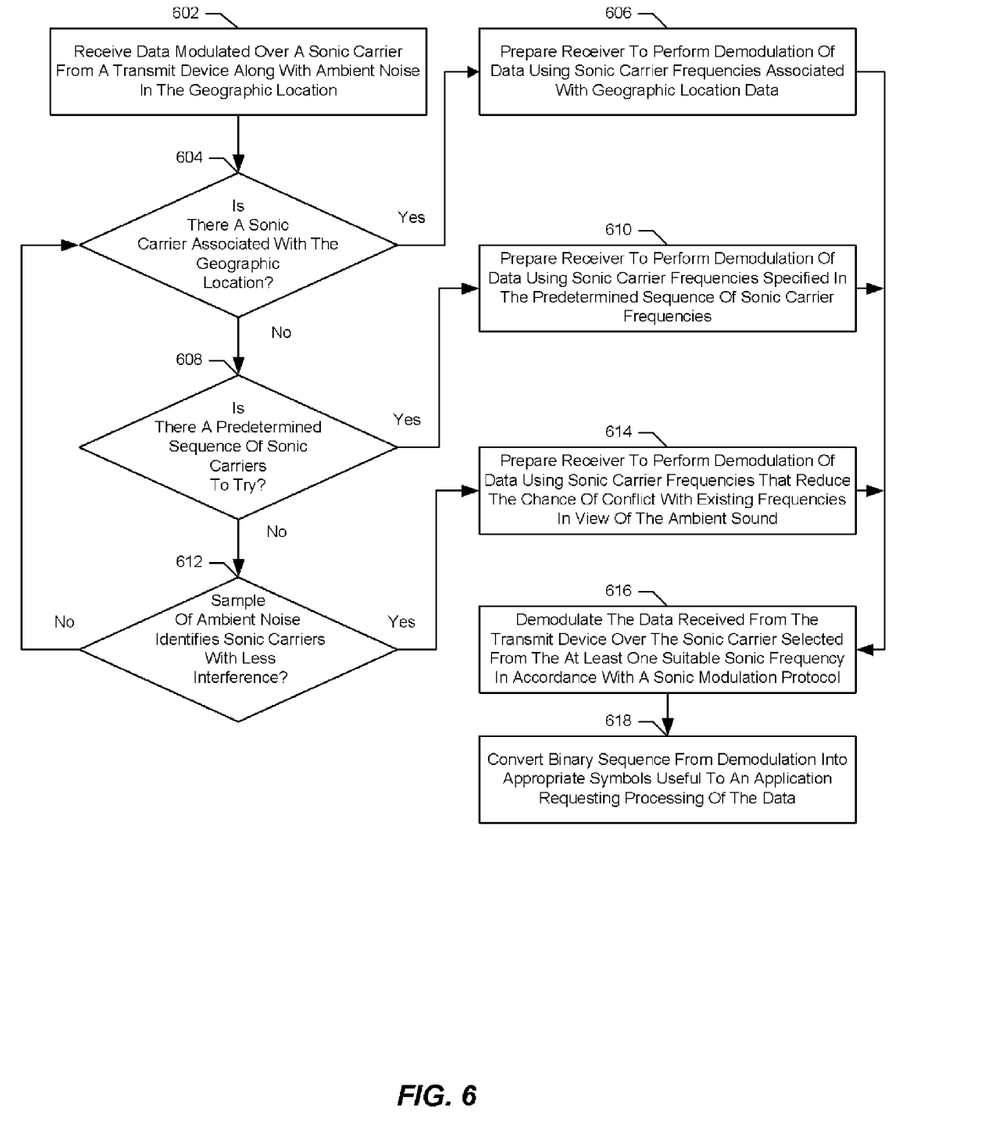
FIG. 6 is yet another flowchart representing the operations for wirelessly receiving the sonic carrier signals and data on a receiver device in accordance with one implementation.

FIG. 6 is yet another flowchart representing the operations for wirelessly receiving the sonic carrier signals and data on a receive device in accordance with one implementation. In this implementation, the receive device receives the modulated data over the sonic carrier signal from the transmit device along with noise in the geographic location (602). A sonic transducer such as a microphone picks up the sonic carrier signal and noise in the area then provides it to a codec on the receive device. Noise may include ambient noise present in the area as well as any injected noise intentionally added to the sonic carrier signal. For example, a "jingle" or song may be injected into the audible range of frequencies that a person may hear and recognize. The codec samples the sound at a sufficiently high sample rate to accurately recover the transmitted sonic carrier signal. In general, the codec operates at a frequency of at least twice the frequency of the sonic carrier signal. For example, a codec operating at sample rate of at least 40 Khz can sample sonic frequencies up to the typical audible frequency range of 20 Khz.

To recover the modulated data, aspects of the present invention may need to determine what sonic frequencies to demodulate. In one implementation, a determination is made whether there is a sonic carrier signal associated with a geographic location (604). For example, a busy retail location may need to use a higher sonic frequency for communication so as to avoid audible noise at lower frequencies from loud music, conversations, electrical appliances, doors shutting or other changes in the noise level at the location. As a result, one implementation may prepare a receive device to demodulate data from sonic carrier frequencies associated with a particular geographic location (606). For example, the GPS built into a phone can be used to identify a geographic location and then determine the sonic transmission frequencies registered for use at the particular location.

In yet another implementation, the data may be modulated on a predetermined sequence of sonic carrier frequencies (608). Transmitting the modulated data over duplicate sonic carrier frequencies provides multiple alternative frequencies for the receiver to demodulate. Accordingly, a receive device may be configured to demodulate data using multiple predetermined sonic carrier frequencies (610). The receive device can select one or more of these sonic carrier frequencies or may demodulate the sonic carrier frequencies in a predetermined order. It is also contemplated that the receive device may select to demodulate the sonic carrier frequencies starting with the highest signal-to-noise ratio.

Alternatively, a sample of the ambient sound may be used to identify the sonic carrier frequencies with the least probable amount of interference (612) A sampling of the ambient sound may identify certain unused sonic frequencies available for the sonic carrier frequencies carrying the modulated data. Generally (614) unused frequencies are above the audible range of sound. Accordingly, aspects of the present invention would then prepare the receive device to perform demodulation of the data using these unused sonic frequencies (614). For example, if the data is modulated over multiple different sonic carrier signals than aspects of the present invention would first attempt to demodulate data from the unused frequencies.

Once the frequencies of the sonic carrier signal are determined, the receiver device proceeds to demodulate the data received from the transmitter device in accordance with the sonic modulation protocol (616). As previously described, one sonic modulation protocol may be compatible with FSK while others may include MSK, QPSK or other protocols. The demodulated data appears as a binary sequence and is then converted into appropriate symbols for the application requesting the processing of the data (618).

Figure 7:
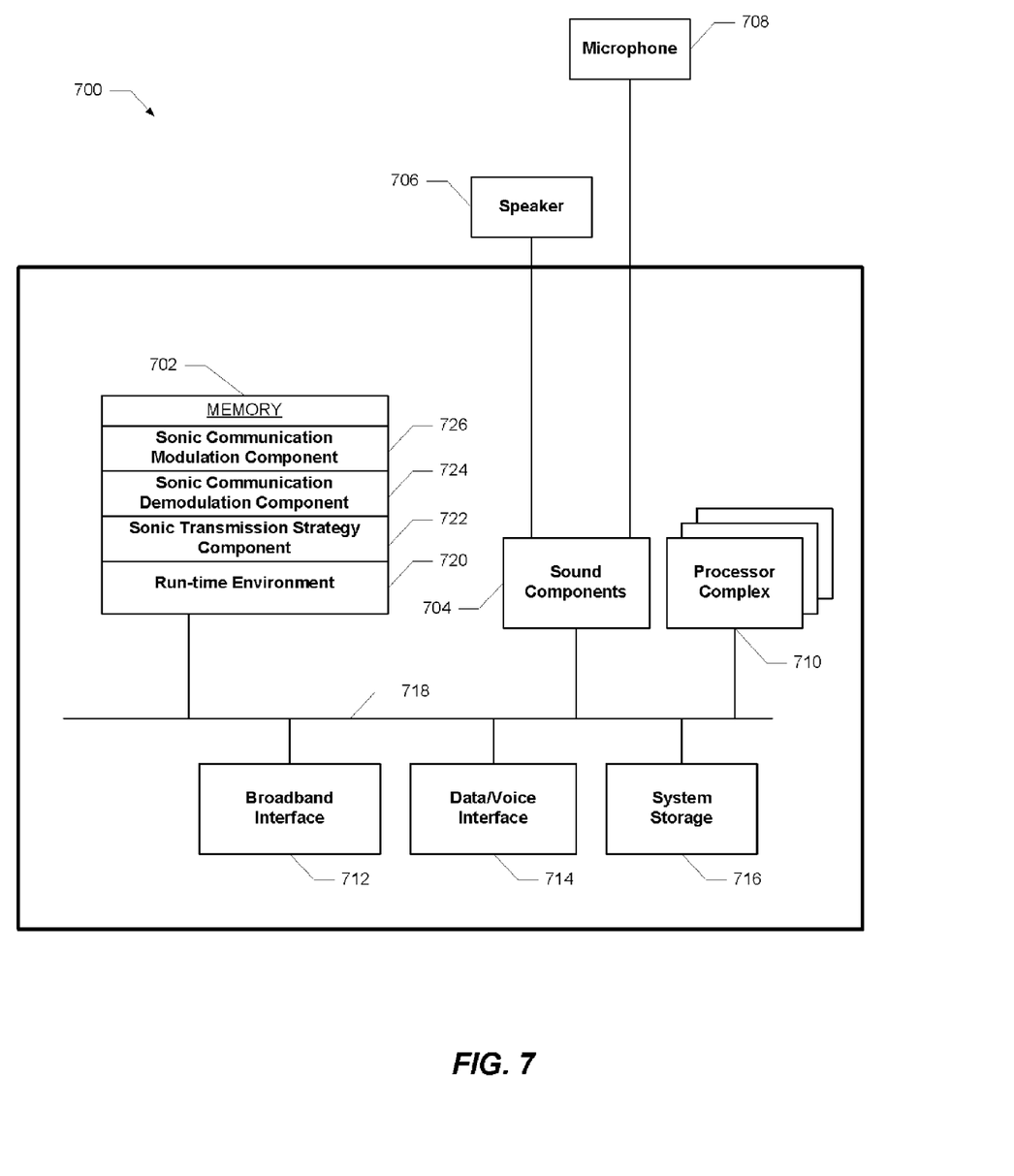
FIG. 7 is a schematic block diagram of a device capable of sonically transmitting and receiving data in accordance with implementations of the present invention.

FIG. 7 is a schematic block diagram of a device 700 capable of sonically transmitting and receiving data in accordance with implementations of the present invention. Device 700 includes a memory 702, sound components 704 with speaker 706 and/or microphone 708, a processor complex 710, a broadband interface 712, data/voice interface 714 and system storage 716 capable. It is contemplated that aspects of the invention described herein with respect to device 700 may apply to any type of wireless phone, computer enabled devices (i.e., point-of-sale terminals, electronic billboards, kiosks) or general-purpose computers capable of performing sonic communication in accordance with the present invention. To that end, device 700 may also be broadly, and alternatively, referred to as a mobile device, wireless phone, smart phone, feature phone, computer, laptop computer, or smart book. Moreover, various aspects of the invention may include the same or similar components despite the particular implementation illustrated in FIG. 7. For example, some implementations may use a central interconnect 718 for communication among the components while other implementations may use multiple direct paths between each of the components. Also, it is contemplated that different implementations may combine one or more of these components into a single component or may separate them into different combinations of components. Functionality provided by device 700 may be implemented in hardware, software or in various combinations thereof depending on the design and implementation details.

In the illustrative implementation in FIG. 7, memory 702 includes storage locations that are addressable by the processor and adapters for storing software program code and data. For example, memory 702 may include a form of random access memory (RAM) that is generally cleared by a power cycle or other reboot operation and classified as "volatile" memory. Processor complex 710 and various adapters may, in turn, comprise processing elements and logic circuitry configured to execute the software code and manipulate the data stored in the memory 702. System storage 716 may be a form of non-volatile storage for storing a copy of run-time environment 720, applications and other data used by device 700.

Memory 702 includes run-time environment 720 portions of which typically reside in memory and are executed by the processing elements. Run-time environment 720 may be based upon a general-purpose operating system, such as Linux, UNIX® or Windows®, the AppleOS® or any other general-purpose operating system. It may also be based upon more specialized operating systems such as the Blackberry Operating system from RIM, Inc., the Symbian OS from Nokia, Inc., the iPhone OS or iOS from Apple, Inc., the Android operating system from Google, Inc. of Mountain View Calif., the Web OS or Palm OS from Palm, Inc. or any other operating system designed for the mobile market place.

Sonic transmission strategy component 722 includes functions and datasets necessary for identifying the sonic transmission frequencies and timing to transmit and receive data sonically in accordance with aspects of the present invention. For example, sonic transmission strategy component 722 may identify the sonic frequencies for transmitting data and to determine an optimal time for sonically transmitting the data. Sonic communication demodulation component 724 includes functions and datasets necessary to demodulate data from sonic carrier signals sent over various sonic transmission frequencies in accordance with a sonic communication protocol such FSK modulation. Likewise, sonic communication modulation component 726 includes functions and datasets that encode data and modulate it over sonic transmission frequencies using a sonic carrier signal in accordance with the present invention.

Sound components 704 include codecs and other components for converting sound transmitted through microphone 708 into a digital format such as PCM (pulse-code modulation). These codecs are also capable of converting the digital information back into a sonic analog signal and then broadcasting through speaker 706.

Processor complex 710 may be a single processor, multiple processors or multiple processor cores on a single die. It is contemplated that processor complex 710 represents the one or more computational units available in device 700. Processor complex 710 may also be a physical aggregation of multiple individual processors that each individually process and transfer data over interconnect 718. Alternate implementations of processor complex 710 may be a single processor having multiple on-chip cores that may partition and share certain resources also on the processor die such as L1/L2 cache. For at least these reasons, aspects of the present invention may be described as using a processor or multiple processors for convenience however it is contemplated that the term "processor" could also be applied to designs utilizing one core or multiple cores found on a single chip or die. Likewise, the term process is used to describe the act of executing a set of related instructions on one or several processors but it is also contemplated that alternate implementations could be performed using single or multiple threads executing the same or similar instructions on one or several processors each capable of multi-threaded execution.

Broadband interface 712 may be a WiFi, WiMAX or other connection to a network such as the Internet. The broadband interface 712 may also include wired connections to the Internet using CAT 5/6, Fiber Channel or similar methods. Data/voice interface 714 includes functions and datasets for transmitting data and voice over a wireless network. Protocols used for data/voice interface 714 may include one or more of GSM, CDMA, TDMA, FDMA or other wireless protocols. The data portions of data/voice interface 714 may carry data at 2 G, 2.5 G, 3 G, 4 G and beyond implemented using various wireless protocols including EDGE, EV-DO, HSPA, and others.

System storage 716 includes an area for storing applications, operating system portions, and data. It is contemplated that system storage 716 may be on a removable SD (secure digital) storage or other similar device and that the SD storage may include security features for holding critical pieces of information such as credit card numbers and other similar information. Alternatively, system storage 716 may include conventional magnetic tapes or disks, optical disks such as CD-ROM, DVD, magneto-optical (MO) storage or any other type of non-volatile storage devices suitable for storing large quantities of data. These latter storage device types may be accessed locally through a direct connection or remotely in the "cloud" through broadband interface 712 or data/voice interface 714 type network connections.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read only memory and/or a random access memory. Generally, a computer will include one or more mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A processor implemented method of wirelessly receiving data, comprising:
   receiving on a sonic transducer of a receive device sensitive to a wide frequency range of sound, data modulated over one or more sonic carrier signals traveling through air and transmitted as audible or inaudible sound over the wide frequency range of sound from a transmit device along with ambient sound within a geographic location;
   selecting one or more sonic transmission frequencies from a set of audible or inaudible sonic transmission frequencies for demodulation that reduce the probability of conflict with sonic transmission frequencies present in the ambient sound of the geographic location;
   configuring the receive device, in receipt of the one or more sonic carrier signals transmitted as audible or inaudible sound, to perform demodulation of the data at the selected one or more sonic transmission frequencies; and
   demodulating the data carried by one or more sonic carrier signals in the audible or inaudible sonic transmission frequencies in accordance with a sonic modulation protocol.

2. The method of claim 1 wherein demodulating the data carried by one or more frequencies of the sonic carrier signals further comprises,
   grouping a binary sequence of data demodulated in accordance with the sonic modulation protocol into logical frames for further processing; and
   converting each logical frame of the binary sequence of data in, appropriate symbols suitable for an application requesting the demodulation of the data from the sonic carrier signals.

3. The method of claim 2 wherein demodulating the data further comprises:
   decoding the data from one or more frequencies of the sonic carrier signal in accordance with a frequency-shift keying (FSK) protocol.

4. The method of claim 1 wherein using one or more sonic carrier frequencies further comprises,
   sampling ambient sound in the geographic location of the receiver device to determine a sonic frequency profile for the geographic location and one or more suitable frequencies for sonic communication.

5. The method of claim 4 wherein determining the one or more sonic frequencies further comprises,
   gathering one or more sonic frequency profiles over time in the geographic location of the transmit device; and
   determining a current sonic frequency profile for the geographic location using the gathered sonic frequency profiles.

6. The method of claim 5 wherein the geographic location is determined using global positional system (GPS) data.

7. An apparatus for wirelessly receiving data, comprising:
   a processor for executing instructions;
   memory containing instructions when executed that cause the processor to, receive on a sonic transducer of a receive device sensitive to a wide frequency range of sound, data modulated over one or more sonic carrier signals traveling through air and transmitted as audible or inaudible sound over the wide frequency range of sound from a transmit device along with ambient sound within a geographic location, select one or more sonic transmission frequencies from a set of audible or inaudible sonic transmission frequencies for demodulation that reduce the probability of conflict with sonic transmission frequencies present in the ambient sound of the geographic location;

configure the receive device in receipt of the one or more sonic carrier signals transmitted as audible or inaudible sound to perform demodulation of the data at the selected one or more sonic transmission frequencies, and demodulate the data carried by one or more sonic carrier signals in the audible or inaudible sonic transmission frequencies in accordance with a sonic modulation protocol.

8. The apparatus of claim 7 wherein using one or more sonic carrier frequencies further comprises instructions when executed, sample ambient sound in the geographic location of the receiver device to determine a sonic frequency profile for the geographic location and one or more suitable frequencies for sonic communication.

9. The apparatus of claim 8 wherein determining the one or more sonic frequencies further comprises instructions when executed, gather one or more sonic frequency profiles over time in the geographic location of the transmit device, and determine a current sonic frequency profile for the geographic location using the gathered sonic frequency profiles.

* * * * *

UNITED STATES PATENT AND TRADEMARK OFFICE
CERTIFICATE OF CORRECTION

| | | |
|---|---|---|
| PATENT NO. | : 8,514,662 B2 | Page 1 of 1 |
| APPLICATION NO. | : 12/870767 | |
| DATED | : August 20, 2013 | |
| INVENTOR(S) | : Brett Paulson | |

It is certified that error appears in the above-identified patent and that said Letters Patent is hereby corrected as shown below:

On the title page, item (54) and in the specification, column 1, the title initially printed on the subject patent "SONIC RECEIVER AND METHOD FOR RECEIVING DATA THAT USES MODULATION FREQUNCIES THAT REDUCE THE PROBABILITY OF CONFLICT WITH AMBIENT NOISE IN THE ENVIRONMENT" should instead have the title "SONIC COMMUNICATION SYSTEM AND METHOD".

Signed and Sealed this
Fourteenth Day of October, 2014

Michelle K. Lee
*Deputy Director of the United States Patent and Trademark Office*